United States Patent [19]
Allen et al.

[11] Patent Number: 5,911,063
[45] Date of Patent: Jun. 8, 1999

[54] METHOD AND APPARATUS FOR SINGLE PHASE CLOCK DISTRIBUTION WITH MINIMAL CLOCK SKEW

[75] Inventors: David Howard Allen; Charles Luther Johnson, both of Rochester, Minn.

[73] Assignee: International Business Machines Corporation, Armonk, N.Y.

[21] Appl. No.: 08/914,080

[22] Filed: Aug. 18, 1997

Related U.S. Application Data

[63] Continuation-in-part of application No. 08/676,622, Jul. 10, 1996, abandoned.

[51] Int. Cl.$^6$ .................................................. G06F 1/04
[52] U.S. Cl. ............................................ 395/555; 395/558
[58] Field of Search .................................. 395/551, 552, 395/555, 556, 558; 364/488, 489, 490, 491; 327/292, 297

[56] References Cited

U.S. PATENT DOCUMENTS

| | | |
|---|---|---|
| 3,745,472 | 7/1973 | Garth . |
| 4,839,604 | 6/1989 | Tanahashi . |
| 4,855,616 | 8/1989 | Wang et al. . |
| 5,164,817 | 11/1992 | Eisenstadt et al. . |
| 5,235,600 | 8/1993 | Edwards . |
| 5,239,215 | 8/1993 | Yamaguchi ............................ 307/480 |
| 5,384,497 | 1/1995 | Britton et al. . |
| 5,397,943 | 3/1995 | West et al. . |
| 5,398,262 | 3/1995 | Ahuja . |
| 5,410,491 | 4/1995 | Minami . |
| 5,444,407 | 8/1995 | Ganapathy et al. . |
| 5,656,963 | 8/1997 | Masleid et al. ........................... 327/297 |
| 5,691,662 | 11/1997 | Soboleski et al. ....................... 327/292 |

FOREIGN PATENT DOCUMENTS

| | | | |
|---|---|---|---|
| 401289155 | 11/1989 | Japan ...................................... | 257/208 |

OTHER PUBLICATIONS

K. Klein, D. Schmunkamp and U. Weiss, IBM Technical Disclosure Bulletin, "Clock Distribution Tree for Minimal Clock Skew," vol. 36, No. 05, May 1993, pp. 307–308.

*Primary Examiner*—Dennis M. Butler
*Attorney, Agent, or Firm*—Joan Pennington

[57] ABSTRACT

A method and apparatus are provided for generating and distributing a single phase clock in a processor design. A single phase clock signal is generated and applied to a metal grid structure. The metal grid structure is used to distribute the single phase clock signal across an integrated circuit chip. Local clock buffers are used to generate a local clock copy and a local clock complement of the single phase clock signal. Testing is provided with scannable latches by enabling a multiplexer in the latches to select between functional data, scan data, and a reload of latch data. Pipelined globally routed multiplexer scan and hold signals control scan and hold functional modes of the multiplexer. A latch hold function allows the single phase global clock signal to appear functionally as multiple clock frequencies.

12 Claims, 7 Drawing Sheets

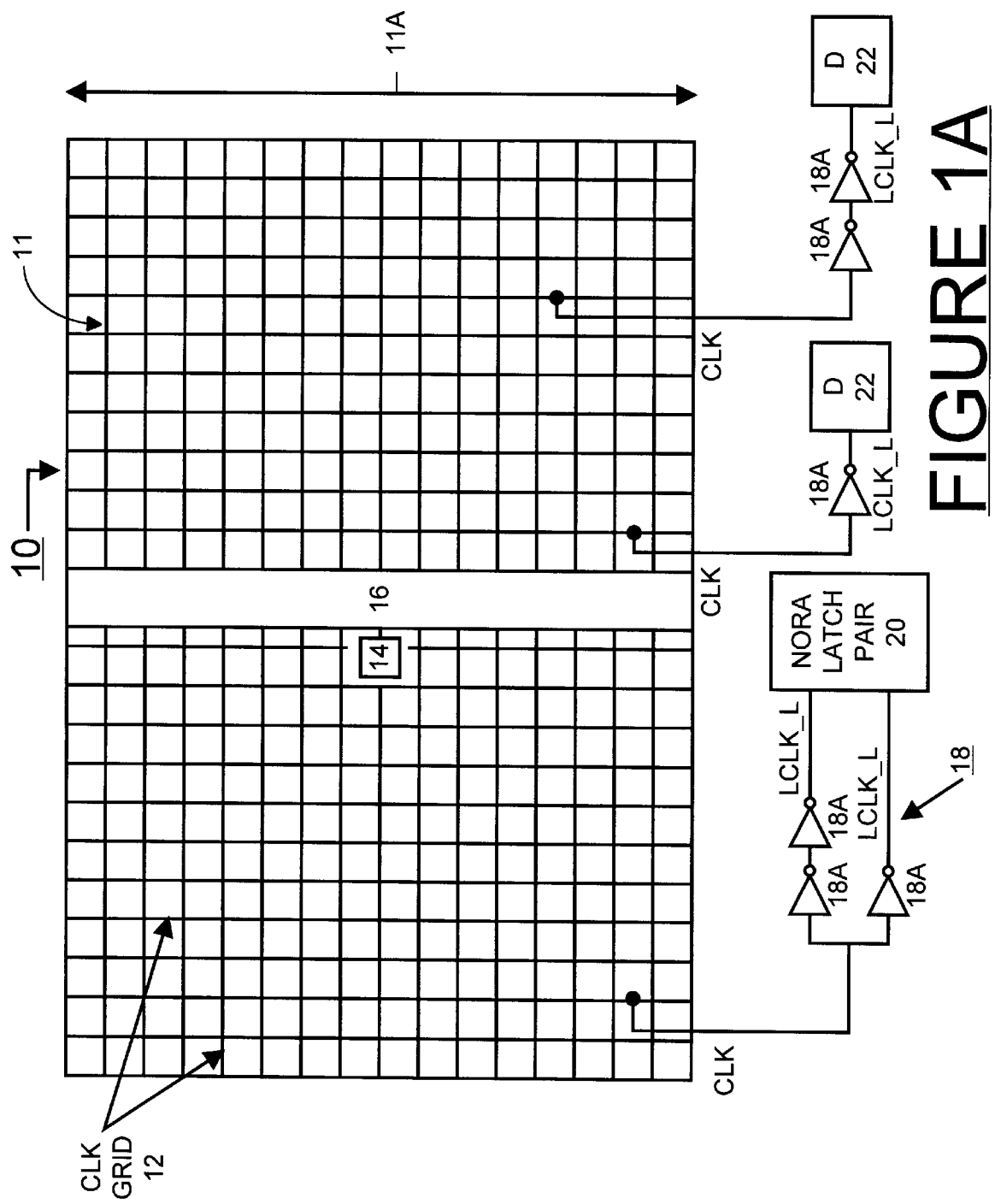

| HOLD | SCAN | STALL | MODE | F0 | F1 |
|---|---|---|---|---|---|
| 0 | 0 | 0 | FUNCTIONAL LOAD | 0 | X |
| 0 | 0 | 1 | FUNCTIONAL STALL | 1 | 0 |
| 0 | 1 | X | SCAN | 1 | 1 |
| 1 | X | X | HOLD | 1 | 0 |

FIGURE 3

METHOD AND APPARATUS FOR SINGLE PHASE CLOCK DISTRIBUTION WITH MINIMAL CLOCK SKEW

This is a continuation-in-part of U.S. patent application Ser. No. 08/676,622 filed Jul. 10, 1996 now abandoned.

FIELD OF THE INVENTION

The present invention relates a method and apparatus for generating and distributing a single phase clock in a processor design to minimize the effect of clock skew on performance, enable functional and test operations, and minimally impact design schedule.

DESCRIPTION OF THE PRIOR ART

Past processors generally have relied on level-sensitive scan design (LSSD) technology to provide adequate test coverage. The LSSD system uses trigger-latch combinations that operate as shift register latches that enables the hardware to be initialized or read by a serial scanning technique. LSSD latches require multiple clocks to control the various functional and test mode operations which the LSSD latches provide. Typically, these multiple clocks are generated through a clock tree which consists of multiple levels of gating and repowering. The depth of these clocks trees results in the opportunity for delay variations due to processing and environmental influences. Delay variations surface as clock skew. Positive clock skew where clock at a source arrives later with respect to the beginning of each cycle than the clock at a sink directly impacts usable cycle time and therefore performance of a processor design. In addition, negative clock skew where the clock at a source arrives earlier than a clock at sink can result in a fast path causing a hold time violation which is fatal to the function of a design.

Unfortunately, as chips grow larger and cycle times decrease, it is not possible to scale back the depth of the clock tree to match the reduction of cycle times, and clock skew due to process variation becomes a larger and larger percentage of the cycle time in an LSSD-based processor design. While it may be convenient to "hide" test functions in the clocking system, for example, LSSD testing technique, the price in performance impact or clock skew is too high for large designs operating, for example at less than 5ns cycle times.

In addition, the multiple clocks required for LSSD technology must be physically distributed to the latches through metal wiring, which varies in length and loading unless strict control, normally through computer-aided design software, is maintained over the routing and connection. Typically load and length balancing is required to ensure that the impedance of each branch of the multiple clock trees is roughly equivalent. Typically most of the routing of clock wires is performed after the latches are placed on the integrated circuit chip based on performance, clock tree distribution and balancing occurs very late in the integrated circuit design cycle when peaked pressure to meet design objectives and scheduled dates.

Another requirement of multiple clocks is that different clocks must be started and stopped when switching between test and functional modes. Starting and stopping clocks, particularly in large chips, results in a large change in the current flowing (di/dt) through the supply distribution network. Inductance in the supply, coupled with large di/dt, can cause enough voltage transients on the supply to disrupt the state of storage elements in the chip.

SUMMARY OF THE INVENTION

Important objects of the present invention are to provide an improved method and apparatus for generating and distributing a single phase clock in a processor design; to provide such method and apparatus for generating and distributing a single phase clock that minimizes the effect of clock skew on performance, that enables functional and test operations, and that minimally impacts design schedule requirements. Other objects of the invention are to provide such single phase clock apparatus and method substantially without negative effects and that overcome many disadvantages of prior art arrangements.

In brief, a method and apparatus are provided for generating and distributing a single phase clock in a processor design. A single phase clock signal is generated. A metal grid structure is used to distribute the single phase clock signal across an integrated circuit chip.

In accordance with features of the invention, local clock buffers are used to generate a local clock copy and a local clock complement of the single phase clock signal. Testing is provided with scannable latches by enabling a multiplexer in the latches to select between functional data, scan data, and a reload of latch data. Pipelined globally routed multiplexer scan and hold signals control scan and hold functional modes of the multiplexer.

BRIEF DESCRIPTION OF THE DRAWINGS

The present invention together with the above and other objects and advantages may best be understood from the following detailed description of the preferred embodiments of the invention illustrated in the drawings, wherein:

FIG. 1A is a schematic diagram representation of a single phase clock generation and distribution apparatus together with exemplary circuitry utilizing the single phase clock in accordance with the invention;

FIG. 3 is a table illustrating multiplexer control of the exemplary test function apparatus of FIG. 2 in accordance with the invention.

DETAILED DESCRIPTION OF THE PREFERRED EMBODIMENTS

Figure 1B:
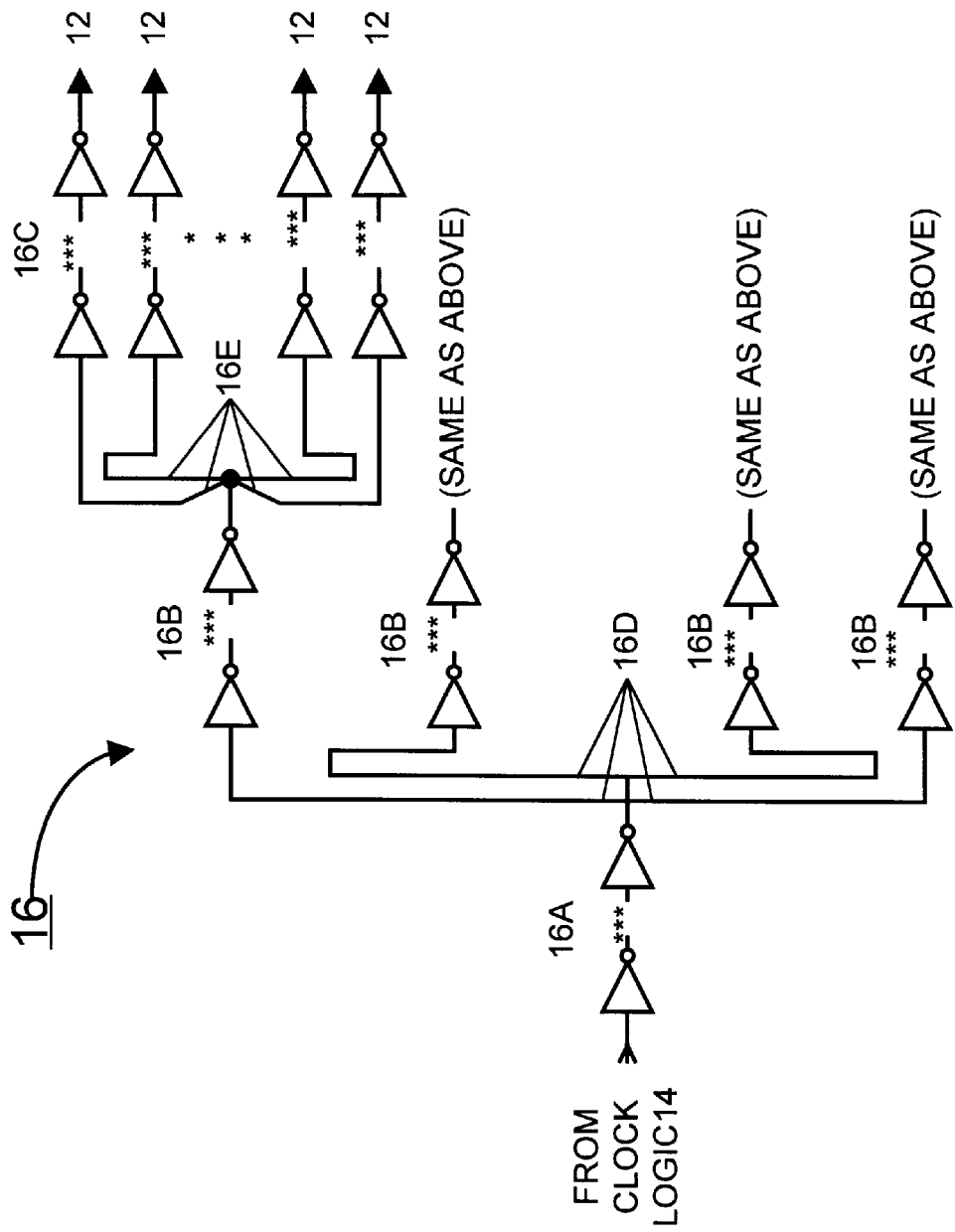
FIG. 1B is a schematic diagram representation illustrating structure of a clock buffer of the single phase clock generation and distribution apparatus of FIG. 1A.

Having reference now to the drawings, FIG. 1A illustrates a single phase clock generation and distribution apparatus in accordance with the invention generally designated by the reference character 10. In accordance with features of the invention, single phase clock generation and distribution apparatus 10 includes a metal clock grid 12 to distribute a single free-running clock CLK across an integrated circuit chip generally designated by 11. The single free-running clock CLK is generated by a clock logic 14 coupled to the metal clock grid 12 by a clock buffer 16. Clock buffer 16 drives the wiring of the metal grid for the entire integrated circuit chip 11. Clock buffer 16 is illustrated and described with respect to FIGS. 1B and 1D. The metal grid 12 is defined by a plurality of spaced-apart vertical and horizontal interconnected metal conductors. The overall dimensions of the metal grid 12 generally corresponds to the dimensions including width and height of the integrated circuit chip 11. The single phase clock signal CLK is applied and distributed by the clock buffer 16 to an interior generally central portion of the metal grid 12 along the entire width or height of the metal grid 12 as indicated by an arrow labeled 11A. The clock buffer 16 effectively eliminates clock skew in one dimension of the metal grid 12 indicated by arrow 11A.

Local clock buffers 18 generate or re-power a local copy LCLK and complement LCKL_L of the global clock CLK. The local clock buffers 18 are shallow including one or two inverters 18A so skew is minimized due to process variation, while the local clock buffers 18 significantly reduce the capacitive load on the grid 12 and ease the requirement on the integrity of the grid signal. The metal grid 12 and clock buffer 16 together reduce the uncertainty and variation in the arrival time of the clock signal CLK at multiple circuits on the chip, such as no-race (NORA) latch pairs 20 and domino logic 22. NORA latches 20 are used rather than pass-gate LSSD latches to facilitate simple generation of local clock phases. NORA latches 20 are immune to early-mode caused by overlapping complementary clocks.

As compared to multiple clock distribution for LSSD systems, the use of the metal grid structure 12 for distributing the single phase clock CLK reduces the sensitivity of the clock distribution network to changes in loading and eliminates the need for load balancing. Metal grid 12 provides for less skew or greater usable clock cycle, less area eliminating the requirement for early-mode padding, and an overall simpler clocking system 10 which reduces the analysis and design burden on the integrated circuit chip designer.

FIG. 1B illustrates the structure of the clock buffer 16. Clock buffer 16 includes a first series of inverters labeled 16A, a second series of inverters labeled 16B and a third series of inverters labeled 16C. The signal generated by the clock logic 14 is buffered by the first series of inverters 16A. The output of the last inverter in the chain drives a plurality of wires 16D. The wires 16D connect to the second series of inverters 16B. Each of second series of inverters 16B in turn fan out to a third series of inverters 16C through a plurality of wires 16E, as shown for one of second series of inverters 16B in the FIG. 1B. The output of the third and final series of inverters 16C connects to each of the horizontal wires in the clock grid 12. The number of inverters in each group 16A, 16B, 16C may vary depending on design requirements, including the input capacitance, power, area, delay, and total capacitive load on the clock grid 12. Also it should be understood that the number of series of inverters 16A, 16B, and 16C can be increased or decreased depending on the same design requirements.

The wires 16D are balanced such that each wire is the same length and therefore has the same impedance. Similarly the wires 16E are balanced such that each wire is the same length and therefore has the same impedance. As shown in FIG. 1B, balancing the wires 16D normally requires adding length to wires that connect to inputs of the second series of inverters 16B which are closer than the furthest inputs of the top and bottom ones of the second series of inverters 16B. Each inverter series 16B has an identical design. Therefore, the delay from the input from clock logic 14, through the first inverter series 16A, through any of the wires 16D to the input to a first inverter in the second inverter series 16B, and continuing through the second inverter series 16B to the output of the last inverter is the same for all paths. Likewise, the wires 16E are all balanced having the same length and the inverter series 16C are all of identical design, so that the delay from the output of the last inverter in 16B through any wire 16E and on through the inverter series 16C to the grid 12 is the same.

In this way, all points of the grid 12 driven by the clock buffer 16 receive the clock signal simultaneously. The clock signal propagates along these horizontal wires as shown in FIG. 1A or vertical wires to the edges of the chip 11 with some delay due to the parasitic impedance of the metal grid wires 12.

Figure 1C:
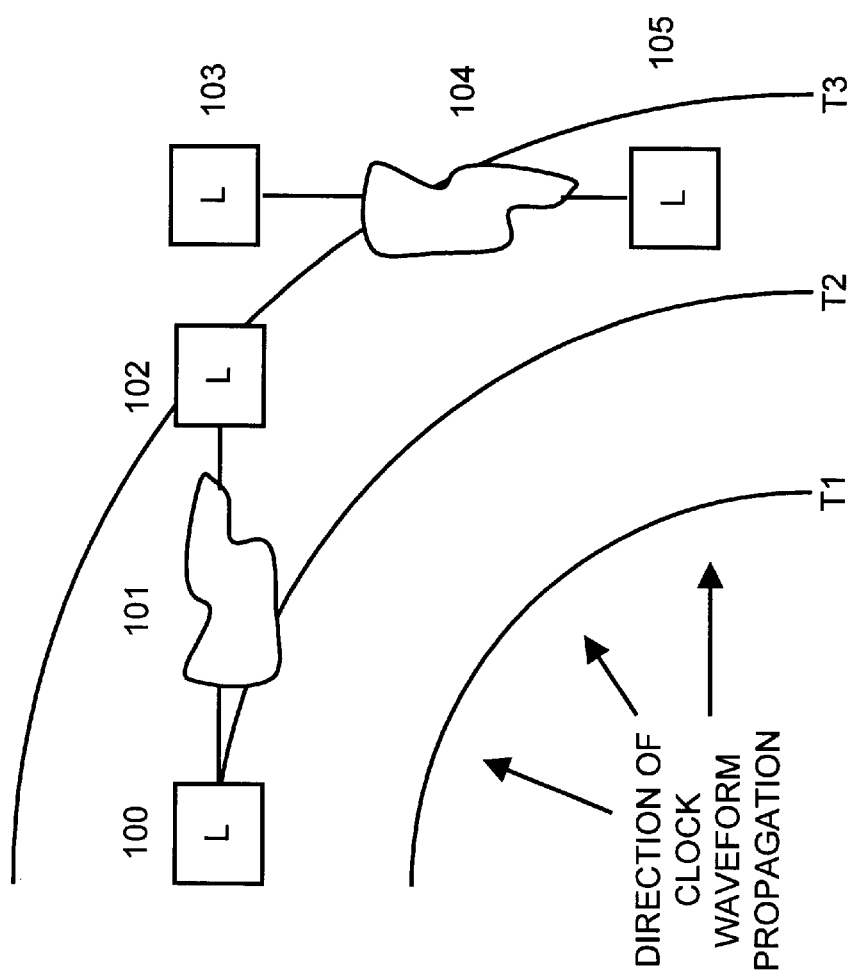
FIG. 1C is a chart illustrating clock waveform propagation with a prior art clock generation apparatus which drive a clock grid from a single point near the center of an integrated circuit chip.
Figure 1D:
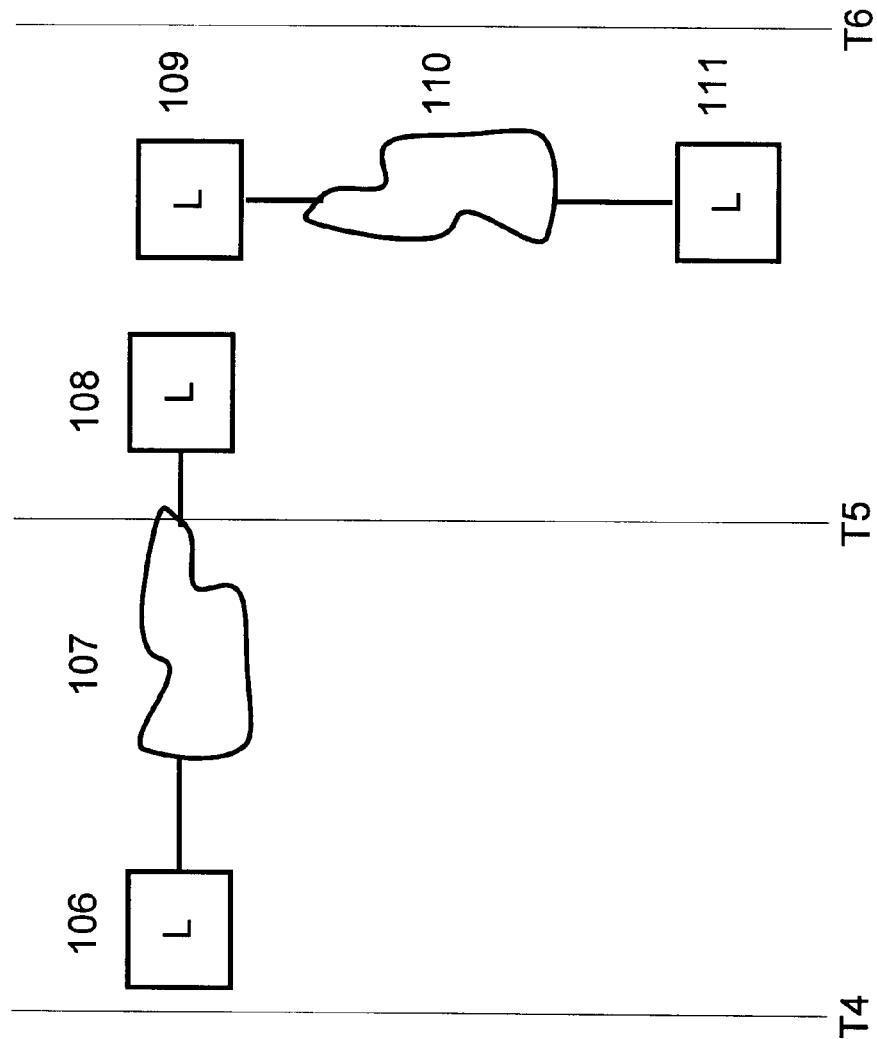
FIG. 1D is a chart illustrating clock waveform propagation with the single phase clock generation and distribution apparatus of FIG. 1A.

Having reference now to FIGS. 1C and 1D, an improvement provided by the single phase clock generation and distribution apparatus 10 in accordance with the invention over previous designs may be understood. In FIG. 1C, performance of a prior art clock generation and distribution apparatus which drives the grid from a single point near the center of a chip is shown. In prior art designs, the clock propagates out in a circular pattern from the center and any two points on a clock grid which are equidistant radially from the center of distribution receive the clock at the same time. In the single phase clock generation and distribution apparatus 10 of the invention, any clocked elements on the chip which are the same horizontal distance from the clock buffer 16 receive the clock signal CLK at the same time without being dependent on respective vertical position on the chip 11. This facilitates use of known clock skew in designing a data flow which propagates data vertically between latches and which have no clock skew between each other due to sharing a common distance horizontally from the clock buffer 16.

With the prior art clock apparatus of FIG. 1C, the clock signal propagates radially from the center of the distribution and arrives at each of the multiple latches (L) 100, 102, 103, 105 at different times. Each arc labeled Tl, T2, T3 in FIG. 1C represents a portion of a chip 11 which receives the clock signal at the same time. That is, all latches which are on or near the arc T2 receive the clock at time T2. In this case, latches 100 and 105 receive the clock at time T2. Latches 102 and 103 receive the clock at a later time T3. The amount of logic delay that can be tolerated in a pair of logic blocks 101, 104 is a function of the cycle time and how much difference or clock skew exists between the latches. In the case of a radial propagation of the clock and with a vertical or horizontal arrangement of latches, there is always some skew between latches.

In FIG. 1D with the vertically distributed clock buffer 16, the clock starts at the same point on each horizontal wire of the clock grid 12 and therefore propagates linearly from the generally center spine of the chip 11. The various times T4, T5, T6 again represent areas of the chip 11 that receive the clock signal at the same time. While latches 106, 108 still suffer some skew penalty since latch 106 receives the clock at time T4 and latch 108 receives the clock at time T6, latches 109, 110 and 111 are the same horizontal distance from the clock buffer and therefore receive the clock at the same time T6. Therefore, the amount of logic that may be inserted in area 110 is not affected by the clock skew and can be increased to use the entire cycle time.

Figure 2:
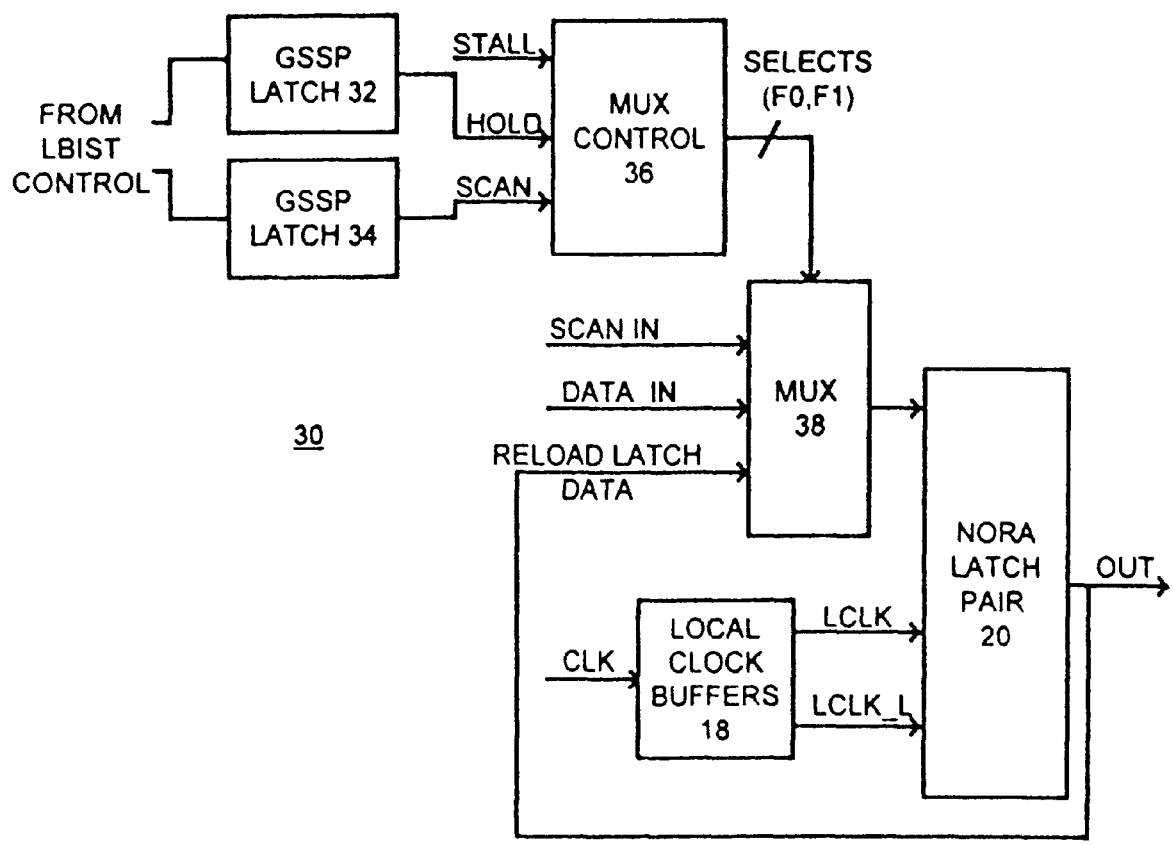
FIG. 2 is a schematic diagram representation of an exemplary test function apparatus used with the single phase clock generation and distribution apparatus of FIG. 1A in accordance with the invention.

FIG. 2 illustrates an exemplary test function apparatus in accordance with the invention generally designated by the reference character 30 used with the single phase clock generation and distribution apparatus 10. Control signals from a logic built in self test (LBIST) are applied to a series of global select signal pipeline (GSSP) latches 32 and 34 that provide a HOLD, SCAN signals to a multiplexer (mux) control 36. A local signal STALL is provided to the mux control 36. Mux control 36 generates multiplexer select signals F0,F1 applied to a multiplexer 38 in a no-race (NORA) latch pair 20 to cause the multiplexer 38 to select one of SCAN IN, DATA IN, or RELOAD LATCH DATA inputs.

FIG. 3 is a truth table illustrating multiplexer operational modes of the test function apparatus 30. As shown in FIG. 3, a functional load mode is provided with a low multiplexer select signal F0 resulting from low HOLD, SCAN, and STALL inputs to the mux control 36. A functional stall mode is provided with a high multiplexer select signal F0 and low multiplexer select signal F1 resulting from a high STALL, and low HOLD and SCAN inputs to the mux control 36. A functional scan mode is provided with both high multiplexer select signals F1 and F0 resulting from a high SCAN and low HOLD, and either a high or low STALL input to the mux control 36. A functional hold mode is provided with a high multiplexer select signal F0 and low multiplexer select signal F1 resulting from a high HOLD and either high or low SCAN and STALL inputs to the mux control 36.

The single phase clock CLK is used without loss of testability with test functions separated from the clock generation and distribution system 10 by the test function apparatus 30. In operation of the test function apparatus 30, NORA latches 20 are scanned by enabling the multiplexer 38 in the NORA latches 20 which selects between function data in, scan data in, and re-load of previous data out of the latches 20 which is required to hold data in the latch pair 20. The mux select HOLD and SCAN signals applied to the mux control 36 to control the scan and hold functions are globally routed with significantly less timing constraints than required for the multiple clocks that perform the equivalent function in LSSD based system. The SCAN and HOLD signals are pipelined through the series of global select signal pipeline (GSSP) latches 32 and 34 distributed across the chip. The use of global HOLD signals, optionally combined locally with other stall or hold signals as shown in FIG. 2, provides an effective way of enabling and disabling storage elements to mimic stopping and changing clocks, for example from test to functional clocks, without actually ever altering the global clock CLK. This allows smooth transition between operation at various frequencies or switching between test and functional modes. Also the latch hold function allows the single phase global clock CLK to appear functionally as multiple clock frequencies. By toggling the functional hold or stall modes on selected cycles, the single phase clock CLK can be divided down to provide an apparent lower clock frequency. For example, by toggling the functional hold or stall modes on every other cycle, an apparent clock frequency of one-half the frequency of the single phase clock CLK is provided.

Figure 4:
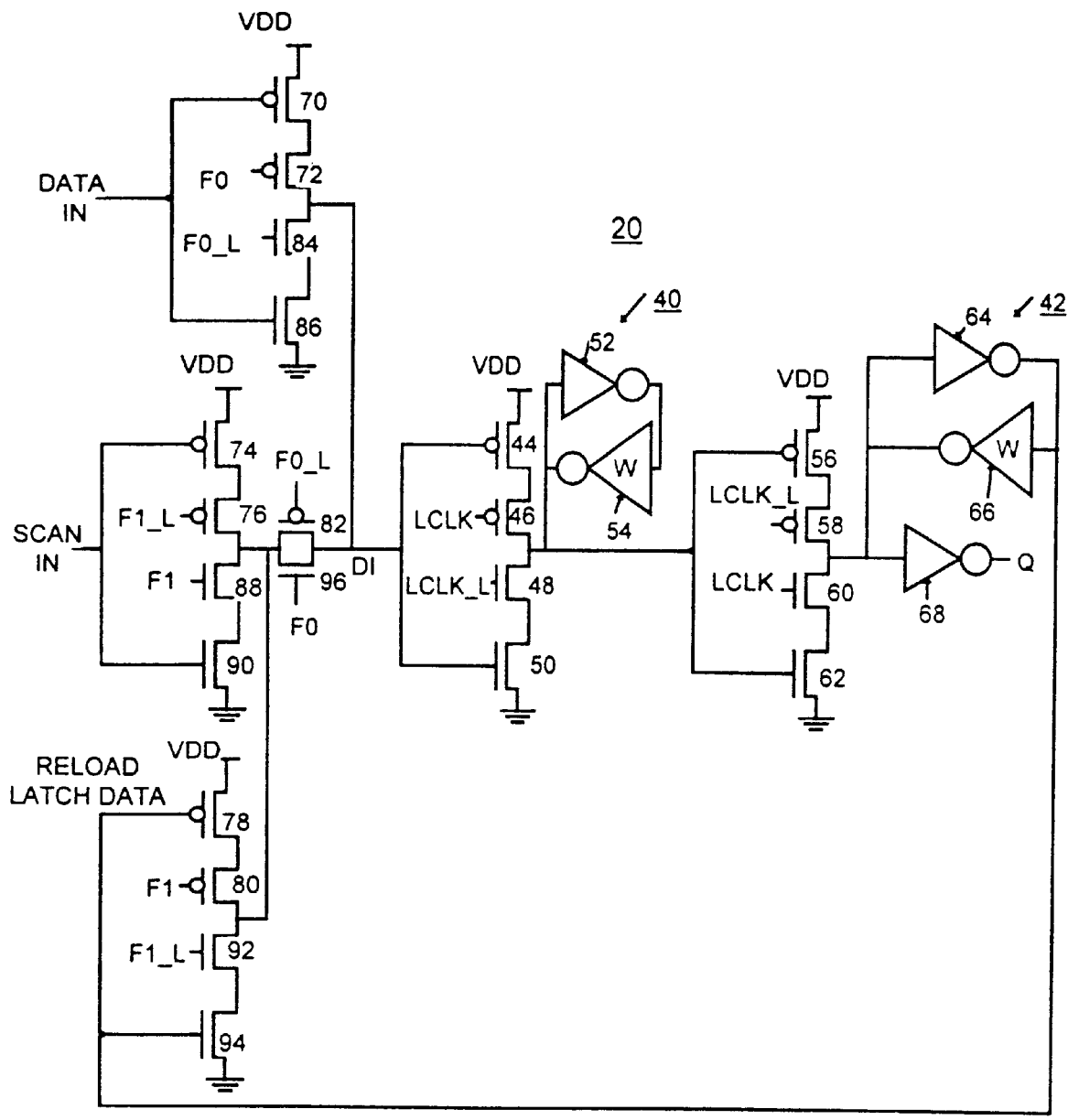
FIG. 4 is a schematic diagram representation of an exemplary static scannable latch pair implementation of the apparatus of FIGS. 1A and 2.

FIG. 4 illustrates an exemplary static latch implementation of the scannable NORA latch pair 20. NORA latch pair 20 includes a first, source latch 40 and a second, destination latch 42 arranged as a D flip-flop latch pair including a 3:1 multiplexer 38. In the NORA latch pair 20, both the first latch 40 and the second latch 42 are gated by both the local clock LCLK and local clock complement LCLK_L. First latch 40 includes a pair of P-channel field effect transistors (FET's) 44 and 46, a pair of N-channel FET's 48 and 50 and a latch inverter 52 and a clocked or weak feedback inverter 54. A mux output labeled DI is applied to a gate input of P-channel FET 44 and N-channel FET 50. Second latch 42 includes a pair of P-channel field effect transistors (FET's) 56 and 58, a pair of N-channel FET's 60 and 62 and a latch inverter 64 and a clocked or weak feedback inverter 66. An output inverter 68 provides an output labeled Q of the NORA latch pair 20. An output of first latch 40 is applied to a gate input of P-channel FET 56 and N-channel FET 62. The local clock complement LCLK_L is applied to a gate input of N-channel FET 48 of the first latch 40 and P-channel FET 58 of the second latch 42. The local clock copy LCLK is applied to a gate input of P-channel FET 46 of the first latch 40 and N-channel FET 60 of the second latch 42. Multiplexer 38 includes a plurality of P-channel FET's 70, 72, 74, 76, 78, 80 and 82 and a plurality of N-channel FET's 84, 86, 88, 90, 92, 94, and 96. The mux select F0 is applied to a gate input of P-channel FET 72 and N-channel FET 96. The mux select complement F0_L is applied to a gate input of P-channel FET 82 and N-channel FET 84. The mux select F1 is applied to a gate input of P-channel FET 80 and N-channel FET 88. The mux select complement F0_L is applied to a gate input of P-channel FET 76 and N-channel FET 92. Data input is applied to a gate input of the P-channel FET 70 and N-channel FET 86. Scan input is applied to a gate input of the P-channel FET 74 and N-channel FET 90. Reload data input is applied to a gate input of the P-channel FET 78 and N-channel FET 94. The data input labeled DI is applied to a gate input of P-channel FET 44 and N-channel FET 50 of the first latch 40.

While FIG. 4 shows a static latch implementation, it should be understood that the present invention can be used with a dynamic latch implementation. For example, by omitting the latch inverter 52 and the clocked or weak feedback inverter 54 from the first latch 40, and/or by omitting the latch inverter 64 and the clocked or weak feedback inverter 66 from the second latch 42 and connecting the gates of FET's 78 and 94 directly to the output Q in FIG. 4, either or both latches 40 and 42 could be made dynamic. Such dynamic latch implementation could provide a power, area, and performance savings, albeit at the expense of reduced testability and increased risk of failure due to noise.

In summary, features and advantage of the clock generation and distribution apparatus 10 over alternate clocking schemes follow: The single phase clock CLK eliminates the requirement to balance clock tree delays and wire lengths. The effect of clock skew on processor performance or cycle time is minimized. Clock skew is predictable early in the development cycle. The resource requirement or workload late in the development cycle is reduced. Contention for area between clock repowering circuits and large macros, such as arrays and the like, is reduced. The single centrally located clock buffer 16 and metal clock distribution grid 12 reduces uncommon delay paths to different clocked elements. Data gating for scan and hold functions allows one clock to serve as functional and test clocks of varying apparent frequency. Pipelined global select signals control scan and hold functions use less chip area and power than repowered separate clocks. Change in current flow di/dt is controlled by use of a free-running clock CLK, and using data select signals instead to regulate storage elements. Early mode or fast path problems are eliminated by use of NORA latches 20 and simple local clock buffers 18. Local clock buffers 18 reduce the load on the grid 12 and act to filter noise and transition time variations from the latches 20. The single phase clock generation and distribution apparatus 10 has minimal impact on performance, requires less human and tool resources that are more distributed over the development cycle, and provides an effective testability solution.

While the present invention has been described with reference to the details of the embodiments of the invention shown in the drawing, these details are not intended to limit the scope of the invention as claimed in the appended claims.

What is claimed is:

1. An apparatus for generating and distributing a single phase clock in an integrated circuit chip comprising:

clock signal generating means for generating a single phase clock signal; said clock signal generating means including clock signal buffer means for distributing said single phase clock signal along one dimension of the integrated circuit chip;

grid means coupled to said clock signal buffer means for distributing said single phase clock signal across an integrated circuit chip;

local clock buffer means for generating a local clock copy of said single phase clock signal and for generating a local clock complement of said single phase clock signal; and scannable latches gated by both said local clock copy and said local clock complement.

2. An apparatus for generating and distributing a single phase clock as recited in claim 1 wherein said grid means include a plurality of spaced-apart vertical and horizontal interconnected metal conductors.

3. An apparatus for generating and distributing a single phase clock as recited in claim 1 wherein said clock signal buffer means is coupled to a generally central portion of each of a plurality of spaced-apart horizontal metal conductors of said grid means.

4. An apparatus for generating and distributing a single phase clock as recited in claim 3 wherein said clock signal buffer means includes a plurality of series connected inverters, each of said plurality of series connected inverters respectively connected by a corresponding one of a plurality of balanced wires, each of said balanced wires having an identical length.

5. An apparatus for generating and distributing a single phase clock as recited in claim 1 wherein said scannable latches include first multiplexer means including first and second inputs for selecting between functional data and scan data.

6. An apparatus for generating and distributing a single phase clock as recited in claim 5 wherein said first multiplexer means include a third input for selecting reload of latch data to hold data in said scannable latches.

7. An apparatus for generating and distributing a single phase clock as recited in claim 6 includes multiplexer control means for generating multiplexer select signals for controlling said multiplexer means.

8. An apparatus for generating and distributing a single phase clock as recited in claim 7 includes global select signal pipeline latches coupled to said multiplexer control means for providing pipelined scan and hold signals.

9. A method for generating and distributing a single phase clock in an integrated circuit chip comprising the steps of:

generating a single phase clock signal;

distributing said single phase clock signal along one dimension of the integrated circuit chip;

driving a metal grid structure with the distributed single phase clock signal to distribute said single phase clock signal across the integrated circuit chip;

utilizing local clock buffers to generate a local clock copy and local clock complement; and utilizing scannable latches gated by both said local clock copy and said local clock complement.

10. A method for generating and distributing a single phase clock as recited in claim 9 further includes the steps of utilizing a multiplexer included in said scannable latches and selecting between functional data, scan data, and reload of latch data.

11. A method for generating and distributing a single phase clock as recited in claim 10 further includes the steps of providing global scan and hold signals to a multiplexer control for controlling said multiplexer.

12. A method for generating and distributing a single phase clock as recited in claim 9 wherein the step of driving a metal grid structure with the distributed single phase clock signal includes the steps applying the distributed single phase clock signal to each of a plurality of spaced-apart horizontal metal conductors of said metal grid structure to distribute said single phase clock signal across the integrated circuit chip.

* * * * *